(12) United States Patent
Kaizuka et al.

(10) Patent No.: US 9,090,959 B2
(45) Date of Patent: Jul. 28, 2015

(54) BEARING STEEL EXCELLENT IN COLD WORKABILITY AND MANUFACTURING METHOD THEREOF

(71) Applicant: Kobe Steel, Ltd., Kobe-shi (JP)

(72) Inventors: Masaki Kaizuka, Kobe (JP); Yosuke Shindo, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 14/384,478

(22) PCT Filed: Mar. 5, 2013

(86) PCT No.: PCT/JP2013/056008
§ 371 (c)(1),
(2) Date: Sep. 11, 2014

(87) PCT Pub. No.: WO2013/146123
PCT Pub. Date: Oct. 3, 2013

(65) Prior Publication Data
US 2015/0129094 A1    May 14, 2015

(30) Foreign Application Priority Data
Mar. 30, 2012  (JP) ................. 2012-083066

(51) Int. Cl.
| | | |
|---|---|---|
| *C22C 38/18* | (2006.01) | |
| *C21D 9/40* | (2006.01) | |
| *C21D 1/32* | (2006.01) | |
| *C22C 38/44* | (2006.01) | |
| *C22C 38/42* | (2006.01) | |
| *C22C 38/04* | (2006.01) | |
| *C22C 38/02* | (2006.01) | |
| *C21D 6/00* | (2006.01) | |
| *C21D 8/00* | (2006.01) | |
| *C21D 7/13* | (2006.01) | |

(52) U.S. Cl.
CPC ............. *C22C 38/44* (2013.01); *C21D 6/004* (2013.01); *C21D 6/005* (2013.01); *C21D 6/008* (2013.01); *C21D 7/13* (2013.01); *C21D 8/005* (2013.01); *C22C 38/02* (2013.01); *C22C 38/04* (2013.01); *C22C 38/42* (2013.01)

(58) Field of Classification Search
None
See application file for complete search history.

(56) References Cited

U.S. PATENT DOCUMENTS

| 4,023,988 A | * | 5/1977 | Stickels et al. ............... 148/622 |
|---|---|---|---|
| 4,581,079 A | * | 4/1986 | Borik ............................ 148/653 |
| 5,705,124 A | | 1/1998 | Ochi et al. |
| 8,894,779 B2 | * | 11/2014 | Hirai et al. ................... 148/334 |
| 2013/0183191 A1 | | 7/2013 | Kaizuka et al. |

FOREIGN PATENT DOCUMENTS

| CN | 1129465 A | 8/1996 |
|---|---|---|
| JP | 5 84405 | 4/1993 |
| JP | 6 299240 | 10/1994 |
| JP | 2001 294972 | 10/2001 |
| JP | 2007 224410 | 9/2007 |
| JP | 2010 47832 | 3/2010 |
| JP | 2011 111668 | 6/2011 |
| JP | 2012 62515 | 3/2012 |
| TW | 201211279 A1 | 3/2012 |

OTHER PUBLICATIONS

Written Opinion of the International Searching Authority Issued May 28, 2013 in PCT/JP13/056008 Filed Mar. 5, 2013.
International Search Report Issued May 28, 2013 in PCT/JP13/056008 Filed Mar. 5, 2013.

* cited by examiner

*Primary Examiner* — Deborah Yee
(74) *Attorney, Agent, or Firm* — Oblon, McClelland, Maier & Neustadt, L.L.P.

(57) ABSTRACT

This bearing steel material satisfies a predetermined elemental composition, and is characterized by having, in the region (boundary region) from the boundary surface of spheroidal cementite to a position at 20 nm away in a base material, no greater than 0.6% (excluding 0%) of Si (boundary Si), no greater than 0.10% (excluding 0%) of Ni (boundary Ni), no greater than 0.10% (excluding 0%) of Cu (boundary Cu), no greater than 0.03% (including 0%) of Mo (boundary Mo), no greater than 0.10% (excluding 0%) of Mn (boundary Mn), and no greater than 0.9% (excluding 0%) of Cr (boundary Cr), and the circularity coefficient of the spheroidized cementite being at least 0.80. The bearing steel material exhibits favorable cold-workability during the production of a bearing component by means of cold working.

2 Claims, No Drawings

US 9,090,959 B2

BEARING STEEL EXCELLENT IN COLD WORKABILITY AND MANUFACTURING METHOD THEREOF

TECHNICAL FIELD

The present invention relates to a steel for manufacturing a bearing component for use in a car, various industrial machines, or the like. More particularly, it relates to a bearing steel exhibiting favorable cold workability in manufacturing a bearing component by cold working, and a manufacturing method thereof.

BACKGROUND ART

Conventionally, as a material for bearings used in various fields such as a car and various industrial machines, there has been used a high carbon chromium bearing steel such as SUJ2 defined according to JIS G 4805 (1999).

The present applicant has submitted various proposals in order to obtain those more excellent in characteristics as the bearing steels. For example, in Patent Literature 1, in order to make favorable the polishability in working into a product shape, and to obtain a favorable rolling contact fatigue life with stability, particularly, the size and the density of Al type nitrogen compounds dispersed in steel, and the size and the area ratio of cementite are defined. Whereas, in Patent Literature 2, in order to further improve the rolling contact fatigue life, the ratio of carbide area ratios respectively observed in the Cr concentrated part due to stripe segregation and the Cr non-segregated part is defined. Further, Patent Literature 3 submits the following proposal: in order to obtain a bearing steel wire rod suitable for deep wire drawing, which is not broken even when subjected to deep wire drawing so that the wire drawing reduction ratio exceeds about 50% (further, 70%), the manufacturing conditions are controlled, thereby to set the mean circle equivalent diameter and the standard deviation of cementite after spheroidizing annealing equal to or smaller than given values for suppressing variations.

Incidentally, a bearing component can be obtained in the following manner: a bearing steel in a shape of wire rod, steel rod, or the like is subjected to cold working such as cutting, forging, or machining, thereby to be worked into a final shape. However, the wire rod or rod material as-hot rolled is too hard, and hence the cold working is difficult to perform. For this reason, in order to improve the cold workability, generally, spheroidizing annealing is carried out before cold working. In order to ensure excellent cold workability, it is important to control the microstructure of the steel after the spheroidizing annealing (spheroidizing annealed material). Thus, various proposals have been submitted.

For example, Patent Literature 4 submits the following proposal: by controlling the hot rolling temperature and the cooling rate in the manufacturing steps, pro-eutectoid network cementite is reduced, and the pearlite lamellar spacing is coarsened. However, with this technology, spheroidal cementite is dispersed uniformly and finely. For this reason, it is considered difficult to say that the hardness is sufficiently reduced.

Whereas, Patent Literature 5 discloses a patent in which, after a spheroidizing annealing treatment, the ferrite mean particle size and the cementite mean particle size after cold wire drawing are defined, thereby to improve the cold workability. However, the C and Cr contents may be high, resulting in the formation of eutectic carbide. For this reason, diffusion annealing becomes essential. Furthermore, after spheroidizing annealing, cold wire drawing is carried out at 20 to 40%, resulting in the degradation of yield of the steel. This conceivably results in a higher manufacturing cost.

However, in recent years, from the viewpoints of further cost reduction and $CO_2$ reduction, more excellent cold workability has been demanded.

CITATION LIST

Patent Literatures

Patent Literature 1 Japanese Unexamined Patent Application Publication No. 2011-111668
Patent Literature 2 Japanese Unexamined Patent Application Publication No. 2010-047832
Patent Literature 3 Japanese Unexamined Patent Application Publication No. 2007-224410
Patent Literature 4 Japanese Unexamined Patent Application Publication No. 6-299240
Patent Literature 5 Japanese Unexamined Patent Application Publication No. 2001-294972

SUMMARY OF INVENTION

Technical Problem

The present invention was completed in view of the foregoing circumstances. It is an object thereof to implement a bearing steel exhibiting more excellent cold workability than in the related art, and a manufacturing method thereof.

Solution to Problem

A bearing steel excellent in cold workability capable of solving the foregoing problem, satisfies:
C: 0.95 to 1.10% (in terms of mass %, the same shall apply to the chemical components, hereinafter),
Si: 0.10 to 0.30%,
Mn: 0.1% to 0.40%,
Cr: 1.00 to 1.50%,
Ni: 0.05% or less (excluding 0%),
Cu: 0.05% or less (excluding 0%), and
Mo: 0.03% or less (including 0%), and the balance consisting of iron and inevitable impurities,
wherein Si (boundary Si), Ni (boundary Ni), Cu (boundary Cu), Mo (boundary Mo), Mn (boundary Mn), and Cr (boundary Cr) included in a region (boundary region) from a boundary surface of spheroidal cementite to a position at 20 nm away in a base material satisfy the following ranges, respectively, and the circularity coefficient of the spheroidal cementite is 0.80 or more:
boundary Si: 0.6% or less (excluding 0%),
boundary Ni: 0.10% or less (excluding 0%),
boundary Cu: 0.10% or less (excluding 0%),
boundary Mo: 0.03% or less (including 0%),
boundary Mn: 0.10% or less (excluding 0%), and
boundary Cr: 0.9% or less (excluding 0%).

The present invention also includes a method for manufacturing the bearing steel.

The method is a method for manufacturing a bearing steel excellent in cold workability. The method includes: using a steel having the composition, performing spheroidizing annealing after hot rolling,
setting an average cooling rate for cooling to 740° C. after the hot rolling to 8° C./s or more, and raising temperature at an average heating rate of 100 to 150° C./hr from room temperature to a temperature range of 780 to 800° C. (soaking temperature) in the spheroidizing annealing, heating at the soaking temperature for 1 to 2 hours, and then, cooling at an average cooling rate of 50 to 150° C./hr from the soaking temperature to 680° C.

Advantageous Effects of Invention

In accordance with the present invention, it is possible to obtain a bearing steel exhibiting more excellent cold workability than in the related art. Use of the bearing steel allows cold working such as cutting, forging, or machining to be performed favorably. Accordingly, when a bearing component such as a ball, a roller, a needle, or a race is manufactured, the life of the die to be used can be lengthened. Further, a race or the like subjected to hot working can be manufactured by cold working. For this reason, it is possible to reduce the $CO_2$ emission amount in a component manufacturing step. Further, it is possible to reduce the spheroidizing time, and it is also possible to reduce the cost.

DESCRIPTION OF EMBODIMENTS

The present inventors aimed to further improve the cold workability of a bearing steel. Thus, in order to reduce the deformation resistance generated upon cold working, the present inventors focused on the boundary, which is the weakest part, between the spheroidal cementite and the matrix phase in the microstructure of the spheroidizing annealed material, particularly, the microstructure (ferrite microstructure) of the boundary region of the matrix phase with the spheroidal cementite.

As a result, the present inventors found the following: (a) in order to reduce the deformation resistance generated upon cold working, it is very effective to reduce the solute elements (Si, Cr, Mn, Ni, Cu, and Mo) in the microstructure of the matrix phase region (the matrix phase region may be hereinafter referred to as a "boundary region") from the spheroidal cementite surface to a position at 20 nm away.

Furthermore, it has been indicated as follows: (b) it is also effective for further improvement of the cold workability that the circularity coefficient of the spheroidal cementite is set at 0.80 or more for ensuring the excellent deformability.

Below, first, the (a) will be described in details.

In the microstructure of a conventional spheroidizing annealed material, the element densities in the boundary region were subjected to line analysis by EDX of FE-TEM. This indicates as follows: in the boundary region, Si, Cu, Ni, and Mo are concentrated to higher densities than respective element densities in the steel matrix phase, and Cr and Mn are depleted to lower densities than respective element densities in the steel matrix phase.

All of Si, Ni, Cu, and Mo are elements each low in equilibrium partitioning ratio, and are hardly dissolved in cementite in spheroidizing annealing. For this reason, it can be considered as follows: the elements are concentrated at the boundary between cementite and the matrix phase; as a result, the ferrite microstructure of the boundary region is strengthened, resulting in an increase in deformation resistance. Accordingly, from the viewpoint of deformation resistance reduction, Si, Ni, Cu, and Mo in the boundary region are desirably reduced.

On the other hand, both of Mn and Cr are elements high in equilibrium partitioning ratio, and tend to be dissolved in cementite in spheroidizing annealing. For this reason, it can be considered that the Mn- and Cr-depleted regions are formed at the boundary between cementite and the matrix phase. When Mn or Cr is depleted, the strength of the ferrite microstructure is reduced. For this reason, it can be considered that the deformation resistance can be reduced.

As described above, in order to ensure the excellent cold workability (in order to reduce the deformation resistance), desirably, Si, Ni, Cu, and Mo which tend to be concentrated in the boundary region are positively reduced, and Mn and Cr which tend to be depleted in the boundary region are reduced. From this viewpoint, the permissible amounts of the respective elements in the boundary region were examined (incidentally, below, Si, Ni, Cu, Mo, Mn, and Cr in the boundary region will be referred to as boundary Si, boundary Ni, boundary Cu, boundary Mo, boundary Mn, and boundary Cr, respectively).

As a result, it has been found as follows: in order to sufficiently reduce the deformation resistance, and to ensure the excellent cold workability, it is desirable to achieve control as follows:
boundary Si: 0.6% or less (excluding 0%),
boundary Ni: 0.10% or less (excluding 0%),
boundary Cu: 0.10% or less (excluding 0%),
boundary Mo: 0.03% or less (including 0%),
boundary Mn: 0.10% or less (excluding 0%), and
boundary Cr: 0.9% or less (excluding 0%).

As described above, all the elements present in the boundary region are preferably reduced in order to reduce the deformation resistance. The boundary Si is preferably 0.5% or less, and more preferably 0.4% or less. The boundary Ni and the boundary Cu are preferably 0.08% or less, respectively, and more preferably 0.05% or less, respectively. Whereas, the boundary Mo is preferably 0.02% or less, and more preferably 0.01% or less. Further, the boundary Mn is preferably 0.08% or less, and more preferably 0.05% or less. The boundary Cr is preferably 0.85% or less, and more preferably 0.70% or less.

Incidentally, for all the elements in the boundary region, the lower limit of each content is not particularly defined from the viewpoint of ensuring the excellent cold workability. However, in consideration of the components in steel, the manufacturing conditions, and the like, the lower limit of the boundary Si is about 0.30%, the lower limit of the boundary Ni is about 0.01%, the lower limit of the boundary Cu is about 0.01%, the lower limit of the boundary Mo is 0%, the lower limit of the boundary Mn is about 0.01%, and the lower limit of the boundary Cr is about 0.60%.

In order to set the boundary Si, the boundary Ni, the boundary Cu, and the boundary Mo within the foregoing ranges, respectively, in the composition (average composition of the matrix phase) in the steel, Si, Ni, Cu, and Mo are required to be set in amounts equal to or smaller than respective prescribed upper limit values, respectively. Whereas, in order to set the boundary Mn and the boundary Cr within the respective ranges, in the composition in the steel, Mn and Cr are required to be set in amounts equal to or smaller than respective prescribed upper limit values, respectively. In addition, the conditions for spheroidizing annealing are required to be controlled as described later.

In the boundary region, the components other than the Si, Ni, Cu, Mo, Cr, and Mn are iron and inevitable impurities.

Then, a description will be given to the (b) (the circularity coefficient of spheroidal cementite is set at 0.80 or more, thereby to ensure excellent deformability).

The relation between the circularity coefficient of spheroidal cementite calculated by the following equation (1) and the cold workability was examined for steels varying in circularity coefficient of spheroidal cementite by performing a cold working test (compression test) shown in embodiments described later. As a result, it has been found as follows: when the circularity coefficient of spheroidal cementite is 0.80 or more, breakage does not occur after compression in the test, and favorable cold workability can be ensured.

On the other hand, when the circularity coefficient is less than 0.80, during cold forging, a stress becomes more likely to be concentrated to spheroidal cementite. Accordingly, cracking occurs at the boundary, so that breakage becomes more likely to occur.

The circularity coefficient of the spheroidal cementite is preferably 0.83 or more, and more preferably 0.86 or more. Incidentally, the upper limit of the circularity coefficient is about 0.95 in terms of the productivity.

$$\text{Circularity coefficient of spheroidal cementite} = 4\pi \times (\text{area of spheroidal cementite})/(\text{circumference length of spheroidal cementite})^2 \quad (1)$$

In order to set the circularity coefficient of spheroidal cementite at 0.80 or more, the configuration is desirably set as follows. Namely, in the present invention, as described in details later, in order to inhibit Cr and Mn in spheroidal cementite from being diffused into the boundary, the spheroidizing annealing time is set shorter than usual. When the spheroidizing annealing time is thus short, division and spheroidizing of pearlite do not proceed sufficiently. Accordingly, the circularity coefficient becomes less than 0.80, so that breakage becomes more likely to occur. Therefore, in the present invention, the rolling conditions before spheroidizing annealing are controlled. Particularly, the average cooling rate after hot rolling is increased to 8° C./s or more, thereby to refine proeutectoid cementite and pearlite. As a result, even when the spheroidizing annealing time is a short time, cementite tends to be spheroidized. Accordingly, the circularity coefficient can be set at 0.80 or more.

Below, the composition and the manufacturing conditions for obtaining the microstructure will be described in details.

First, in order to obtain the microstructure, and to ensure the necessary characteristics as bearing steel, the composition is required to be set within the following range.

C: 0.95 to 1.10%

C is an essential element for increasing the quenching hardness, dispersing proper cementite, maintaining the component strength at room temperature and high temperatures, and imparting the wear resistance. Therefore, C is required to be included in an amount of 0.95% or more, preferably 0.98% or more, and more preferably 1.00% or more. However, a too high C content results in strengthening of ferrite. Accordingly, the deformation resistance becomes more likely to increase. For this reason, the C content is set at 1.10% or less. The C content is preferably 1.05% or less.

Si: 0.10 to 0.30%

Si is a necessary element for improving the temper softening resistance, and ensuring the rolling contact fatigue property of the component. However, when the content is excessive, the boundary Si content also becomes excessive. Thus, solid solution strengthening of the matrix increases the deformation resistance during cold working. Accordingly, the Si content is set at 0.30% or less. The Si content is preferably 0.25% or less, and more preferably 0.20% or less. However, when the Si content is too small, it becomes impossible to sufficiently ensure the rolling contact fatigue property. For this reason, the Si content is set at 0.10% or more. The Si content is preferably 0.13% or more, and more preferably 0.15% or more.

Mn: 0.1% to 0.40%

Mn is a necessary element for improving the quenching property of the base material, and ensuring the rolling contact fatigue property. However, when the content is excessive, the boundary Mn content also becomes excessive. Thus, solid solution strengthening of the matrix increases the deformation resistance during cold working. Accordingly, the Mn content is required to be set at 0.40% or less. The Mn content is preferably 0.35% or less, and more preferably 0.30% or less. However, when the Mn content is too small, the quenching property cannot be ensured. Thus, it becomes difficult to ensure a high component strength and an excellent rolling contact fatigue property. For this reason, the Mn content is set at 0.10% or more. The Mn content is preferably 0.15% or more, and more preferably 0.20% or more.

Cr: 1.00 to 1.50%

Cr is a necessary element for combining with C and forming cementite which is fine and has a circularity coefficient of 0.80 or more, and imparting the cold workability and the wear resistance, and improving the quenching property. In order for such effects to be exerted, the Cr content is required to be set at 1.00% or more. The Cr content is preferably 1.10% or more, and more preferably 1.15% or more. However, when the Cr content exceeds 1.50%, the boundary Cr content also becomes excessive. Thus, solid solution strengthening of the matrix increases the deformation resistance during cold working. For this reason, the Cr content is set at 1.50% or less. The Cr content is preferably 1.45% or less, and more preferably 1.40% or less.

Ni: 0.05% or less (excluding 0%)

Ni is an element which is, as described above, low in equilibrium partitioning ratio, and is concentrated at the boundary between spheroidal cementite and the matrix phase, and increases the boundary Ni content, thereby to increase the deformation resistance. For this reason, the Ni content is desirably minimized. In the present invention, the Ni content is set at 0.05% or less. The Ni content is preferably 0.04% or less, and more preferably 0.03% or less. Incidentally, extreme reduction incurs an increase in steel manufacturing cost. For this reason, the lower limit of the Ni content is about 0.01%.

Cu: 0.05% or less (excluding 0%)

Cu is also an element which is, as described above, low in equilibrium partitioning ratio, and is concentrated at the boundary between spheroidal cementite and the matrix phase, and increases the boundary Cu content, thereby to increase the deformation resistance. For this reason, the Cu content is desirably minimized. In the present invention, the Cu content is set at 0.05% or less. The Cu content is preferably 0.04% or less, and more preferably 0.03% or less. Incidentally, extreme reduction incurs an increase in steel manufacturing cost. For this reason, the lower limit of the Cu content is about 0.01%.

Mo: 0.03% or less (including 0%)

Mo is also an element which is, as described above, low in equilibrium partitioning ratio, and is concentrated at the boundary between spheroidal cementite and the matrix phase, and increases the boundary Mo content, thereby to increase the deformation resistance. For this reason, the Mo content is desirably minimized. In the present invention, the Mo content is set at 0.03% or less. The Mo content is preferably 0.02% or less, and more preferably 0.01% or less. Incidentally, the lower limit of the Mo content is not particularly set, and the case of 0% is also included.

The components of the present invention steel are as described above. The balance consists of iron and inevitable impurities. P which is an inevitable impurity is segregated at the grain boundary, and reduces the rolling contact fatigue property and the impact characteristic. For this reason, the P content is desirably minimized, and is preferably set at 0.05% or less. The P content is reduced to more preferably 0.04% or less, and further preferably to 0.03% or less. Further, S which is an inevitable impurity is precipitated as MnS, and reduces the rolling contact fatigue property. For this reason, the S content is desirably minimized. The S content is preferably controlled to 0.05% or less. The S content is more preferably 0.04% or less, and further preferably 0.03% or less.

Manufacturing Conditions

In order to obtain a bearing steel having the prescribed boundary region, it is necessary to perform manufacturing under the following conditions.

With conventional spheroidizing annealing, the hot rolled material or hot forged material is heated within the temperature range of 780 to 800° C. for 2 to 8 hours. Then, the material is cooled to 680° C. at an average cooling rate of 10 to 15° C./hr, followed by air cooling. Thus, spheroidal cementite is dispersed. As a result, Cr and Mn in spheroidal cementite precipitated during cooling are partially dispersed in the matrix phase. Accordingly, the boundary Cr and the boundary Mn exceed respective prescribed amounts.

In contrast, in the present invention, using the steel with the foregoing composition, after hot rolling, spheroidizing annealing is performed. For this procedure, the average cooling rate to 740° C. after hot rolling is set at 8° C./s or more. In addition, in spheroidizing annealing, the temperature is raised at an average heating rate of 100 to 150° C./hr from room temperature to the temperature range of 780 to 800° C. (soaking temperature). At the soaking temperature, heating is performed for 1 to 2 hours. Then, cooling is performed at an average cooling rate of 50 to 150° C./hr from the soaking temperature to 680° C. (still thereafter, air cooling may be performed). As a result, cementite can be spheroidized. In addition, the densities of Cr and Mn in the boundary region can be controlled within respective prescribed ranges without diffusing Cr and Mn in spheroidal cementite in the matrix phase.

Below, the reason for prescribing respective manufacturing conditions will be described in details.

Average cooling rate to 740° C. after hot rolling: 8° C./s or more

When the average cooling rate to 740° C. after hot rolling is smaller than 8° C./s, prior γ crystal grain becomes coarsened. For this reason, proeutectoid cementite and pearlite cannot be refined. Accordingly, when spheroidizing annealing is performed under the conditions described later, division of pearlite and spheroidizing of proeutectoid cementite cannot be achieved. Thus, the circularity coefficient of spheroidal cementite cannot be set at 0.80 or more. Therefore, the average cooling rate to 740° C. after hot rolling is set at 8° C./s or more. The average cooling rate is preferably 10° C./s or more, and more preferably 20° C./s or more. Incidentally, the upper limit of the average cooling rate is about 100° C./s from the viewpoint of productivity because supercooled microstructure (martensite) causes disconnection.

The conditions for manufacturing up to hot rolling other than those described above have no particular restriction, and general conditions can be adopted. For example, mention may be made of the following: in a heating furnace, heating is performed to 1100 to 1300° C.; then, blooming is carried out at 900 to 1200° C., followed by hot rolling at 830 to 1100° C.

Then, a description will be given to a spheroidizing annealing step after hot rolling.

Average heating rate from room temperature to temperature range of 780 to 800° C. (soaking temperature): 100 to 150° C./hr when the average heating rate from room temperature to the temperature range of 780 to 800° C. (soaking temperature) is lower than 100° C./hr, during pearlite division, Cr and Mn are diffused into the boundary. Accordingly, the boundary Cr and the boundary Mn cannot be controlled within respective prescribed ranges. Therefore, the average heating rate is set at 100° C./hr or more. The average heating rate is preferably 110° C./hr or more, and more preferably 120° C./hr or more. On the other hand, when the average heating rate exceeds 150° C./hr, pearlite cannot be sufficiently divided. Accordingly, the circularity coefficient of cementite becomes smaller than 0.80. Therefore, the average heating rate is set at 150° C./hr or less. The average heating rate is preferably 140° C./hr or less, and more preferably 130° C./hr or less.

Heating within the temperature range of 780 to 800° C. (soaking temperature) for 1 to 2 hours When the soaking temperature is lower than 780° C., division of pearlite becomes insufficient. Accordingly, favorable cementite distribution cannot be obtained. Thus, the circularity coefficient of cementite becomes smaller than 0.80. Therefore, the soaking temperature is set at 780° C. or more. The soaking temperature is preferably 790° C. or more. On the other hand, when the soaking temperature exceeds 800° C., Cr and Mn in spheroidal cementite are diffused into the boundary. Accordingly, it becomes impossible to control the boundary Cr and the boundary Mn within respective prescribed ranges. Therefore, the soaking temperature is controlled at 800° C. or less. The soaking temperature is preferably 795° C. or less.

When the heating time (soaking time) at the soaking temperature is less than 1 hr, division of pearlite becomes insufficient. Accordingly, favorable cementite distribution cannot be obtained. Thus, the circularity coefficient of cementite becomes smaller than 0.80. The soaking time is preferably 1.2 hr or more, and more preferably 1.5 hr or more. However, when the soaking time exceeds 2 hr, Cr and Mn in spheroidal cementite are diffused to the matrix phase side. Accordingly, the boundary Cr and the boundary Mn cannot be controlled to respective prescribed levels. Therefore, in the present invention, the soaking time is set at 2 hr or less. The soaking time is preferably 1.8 hr or less.

Average cooling rate from the soaking temperature to 680° C.: 50 to 150° C./hr

When the average cooling rate from the soaking temperature to 680° C. is smaller than 50° C./hr, Cr and Mn in precipitated spheroidal cementite are diffused into the boundary. Accordingly, the boundary Cr and the boundary Mn cannot be controlled within respective prescribed ranges. Therefore, the average cooling rate is set at 50° C./hr or more. The average cooling rate is preferably 60° C./hr or more, and more preferably 70° C./hr or more. On the other hand, when the average cooling rate exceeds 150° C./hr, spheroidizing of precipitated cementite becomes insufficient. Accordingly, coarsening of cementite proceeds, so that the size becomes 0.6 μm or more. Thus, the circularity coefficient of cementite is smaller than 0.80. Therefore, the average cooling rate is set at 150° C./hr or less. The average cooling rate is preferably 140° C./hr or less, and more preferably 130° C./hr or less.

Cooling at the average cooling rate is performed from the soaking temperature to at least 680° C. At 680° C. or less, diffusion of each element becomes very slow. For this reason, the cooling rate at 680° C. or less hardly affects the boundary region density. Accordingly, the cooling rate at 680° C. or less may be appropriately selected according the production line. Thus, the cooling rate to room temperature after cooling to 680° C. described above has no particular restriction. However, from the viewpoint of productivity improvement, air cooling is desirable.

In accordance with the foregoing method, the soaking time is shorter than that of conventional spheroidizing annealing steps. For this reason, it is possible to reduce the cost and to improve the productivity.

The steel of the present invention is subjected to spheroidizing annealing as described above, and then is worked into a prescribed component shape, followed by quenching/tempering. As a result, the steel is manufactured into a bearing component or the like. The shapes at the steel stage include both of such linear and rod-like shapes as applicable to such manufacturing. The size can also be appropriately determined according to the final product.

EMBODIMENTS

Below, the present invention will be described more particularly by way of embodiments. However, the present invention is by no way limited by the following embodiments. It is naturally understood that the present invention may be appropriately changed within the scope conformable to the gist described above/below, to be practiced. All of these are included in the technical range of the present invention.

The cast pieces of the chemical compositions shown in Table 1 were heated to 1100 to 1300° C. in a heating furnace. Then, blooming was carried out at 900 to 1200° C. Then, hot rolling was performed at 830 to 1100° C., and cooling to 740° C. after completion of hot rolling was carried out at each average cooling rate shown in Table 2, resulting in a steel with a size of 20 mm in diameter. Then, the steel was heated at each average heating rate shown in Table 2 from room temperature to each soaking temperature shown in Table 2, and was held at the soaking temperature for each soaking time shown in Table 2. Then, the steel was cooled at each average cooling rate shown in Table 2 to 680° C., followed by air cooling.

| Steel No. | Chemical composition (mass %) | | | | | | | | |
|---|---|---|---|---|---|---|---|---|---|
| | C | Si | Cr | Mn | P | S | Cu | Ni | Mo |
| 1 | 1.01 | 0.2 | 1.41 | 0.23 | 0.011 | 0.004 | 0.01 | 0.02 | 0.01 |
| 2 | 1.06 | 0.28 | 1.45 | 0.38 | 0.013 | 0.005 | 0.03 | 0.03 | 0.02 |
| 3 | 0.96 | 0.13 | 1.12 | 0.15 | 0.012 | 0.003 | 0.01 | 0.02 | 0.01 |
| 4 | 1.05 | 0.15 | 1.28 | 0.27 | 0.01 | 0.006 | 0.02 | 0.04 | 0.02 |
| 5 | 1.01 | 0.38 | 1.42 | 0.29 | 0.014 | 0.005 | 0.01 | 0.02 | 0.01 |
| 6 | 0.99 | 0.17 | 1.25 | 0.44 | 0.011 | 0.006 | 0.02 | 0.01 | 0.02 |
| 7 | 1.03 | 0.18 | 0.97 | 0.25 | 0.013 | 0.004 | 0.03 | 0.03 | 0.01 |
| 8 | 1.14 | 0.25 | 1.4 | 0.18 | 0.001 | 0.003 | 0.02 | 0.04 | 0.01 |
| 9 | 0.99 | 0.27 | 1.58 | 0.29 | 0.01 | 0.005 | 0.02 | 0.01 | 0.02 |
| 10 | 1 | 0.29 | 1.49 | 0.21 | 0.014 | 0.004 | 0.07 | 0.01 | 0.02 |
| 11 | 0.95 | 0.25 | 1.35 | 0.22 | 0.011 | 0.004 | 0.02 | 0.08 | 0.01 |
| 12 | 1.01 | 0.26 | 1.42 | 0.25 | 0.012 | 0.005 | 0.01 | 0.02 | 0.06 |
| 13 | 0.96 | 0.14 | 1.09 | 0.19 | 0.013 | 0.005 | 0.01 | 0.01 | 0.01 |
| 14 | 1.08 | 0.17 | 1.22 | 0.24 | 0.015 | 0.006 | 0.02 | 0.02 | 0.01 |
| 15 | 1.02 | 0.21 | 1.33 | 0.28 | 0.011 | 0.004 | 0.03 | 0.03 | 0.03 |
| 16 | 0.99 | 0.25 | 1.41 | 0.32 | 0.01 | 0.005 | 0.04 | 0.02 | 0.01 |
| 17 | 0.98 | 0.28 | 1.47 | 0.35 | 0.012 | 0.005 | 0.02 | 0.05 | 0.01 |
| 18 | 1.02 | 0.18 | 1.35 | 0.18 | 0.013 | 0.01 | 0.02 | 0.03 | 0.01 |

| No. | Steel No. | Average cooling rate to 740° C. after hot rolling (° C./s) | Spheroidizing heat treatment conditions | | | |
|---|---|---|---|---|---|---|
| | | | Average heating rate (° C./hr) | Soaking temperature (° C.) | Soaking time (hr) | Average cooling rate to 680° C. (° C./hr) |
| 1 | 1 | 1 | 80 | 795 | 6 | 15 |
| 2 | 1 | 10 | 120 | 795 | 1.8 | 60 |
| 3 | 1 | 10 | 150 | 795 | 1.8 | 60 |
| 4 | 1 | 10 | 120 | 795 | 1 | 60 |
| 5 | 1 | 10 | 120 | 795 | 1.8 | 120 |
| 6 | 1 | 10 | 80 | 795 | 1.8 | 60 |
| 7 | 1 | 10 | 120 | 820 | 1.8 | 60 |
| 8 | 1 | 10 | 120 | 795 | 5 | 60 |
| 9 | 1 | 10 | 120 | 795 | 1.8 | 30 |
| 10 | 1 | 1 | 120 | 795 | 1.8 | 60 |
| 11 | 1 | 10 | 170 | 795 | 1.8 | 60 |
| 12 | 1 | 10 | 120 | 795 | 0.5 | 60 |
| 13 | 1 | 10 | 120 | 760 | 1.8 | 60 |
| 14 | 2 | 10 | 140 | 780 | 1.8 | 130 |
| 15 | 3 | 20 | 140 | 795 | 1.8 | 130 |
| 16 | 4 | 20 | 140 | 795 | 1.5 | 130 |
| 17 | 5 | 10 | 120 | 795 | 1.8 | 60 |
| 18 | 6 | 10 | 140 | 780 | 1.8 | 130 |
| 19 | 7 | 10 | 140 | 780 | 1.8 | 130 |
| 20 | 8 | 10 | 140 | 780 | 1.8 | 130 |
| 21 | 9 | 10 | 140 | 780 | 1.8 | 130 |
| 22 | 10 | 10 | 140 | 780 | 1.8 | 130 |
| 23 | 11 | 10 | 140 | 780 | 1.8 | 130 |
| 24 | 12 | 10 | 140 | 780 | 1.8 | 130 |
| 25 | 13 | 20 | 140 | 795 | 1.8 | 130 |
| 26 | 13 | 20 | 110 | 795 | 1.8 | 130 |
| 27 | 13 | 20 | 140 | 780 | 1.8 | 130 |
| 28 | 13 | 20 | 140 | 795 | 1 | 130 |
| 29 | 14 | 50 | 110 | 780 | 1.2 | 75 |
| 30 | 14 | 50 | 130 | 780 | 1.2 | 75 |
| 31 | 14 | 50 | 110 | 780 | 2 | 75 |
| 32 | 14 | 50 | 110 | 780 | 1.2 | 140 |
| 33 | 15 | 50 | 120 | 790 | 1.5 | 75 |
| 34 | 16 | 30 | 130 | 790 | 1.5 | 120 |
| 35 | 17 | 30 | 140 | 800 | 1.8 | 140 |
| 36 | 18 | 30 | 120 | 790 | 1.5 | 75 |
| 37 | 18 | 30 | 140 | 790 | 1.5 | 75 |
| 38 | 18 | 30 | 120 | 800 | 1.5 | 50 |
| 39 | 18 | 30 | 120 | 780 | 1.5 | 75 |
| 40 | 18 | 20 | 90 | 790 | 1.5 | 75 |
| 41 | 18 | 20 | 120 | 830 | 1.5 | 75 |
| 42 | 18 | 20 | 120 | 790 | 7 | 75 |
| 43 | 18 | 20 | 120 | 790 | 1.5 | 30 |
| 44 | 18 | 5 | 120 | 790 | 1.5 | 75 |
| 45 | 18 | 20 | 180 | 790 | 1.5 | 75 |
| 46 | 18 | 20 | 120 | 790 | 0.5 | 75 |
| 47 | 18 | 20 | 120 | 760 | 1.5 | 75 |
| 48 | 18 | 30 | 120 | 790 | 1.5 | 200 |

Using each steel obtained in the foregoing manner, measurement of each element density in the boundary region, measurement of the circularity coefficient of cementite, and evaluation of the cold workability (cold forging property) were performed in the following manner.

Measurement of Each Element Density in Boundary Region

Each steel after the spheroidizing annealing (heat treatment) was cut at the longitudinal section (cross section in parallel with the rolling direction) so as to allow observation of the position of D (diameter)/4. After polishing the cross section, a specimen was manufactured by a thin film method. By FE-TEM (Field Emission Transmission Electron Microscope), spheroidal cementite was observed. At this step, by EDX (Energy Dispersive x-ray Spectroscope) of TEM, line analysis of spheroidal cementite was carried out through nearly the circle's center of spheroidal cementite (the measurement conditions were as described below), thereby to measure the density of each element of Fe, Si, Mn, Cr, Cu, Ni, and Mo. The analysis was performed on five arbitrarily selected spheroidal cementites. The average values of respective elements in the region from the boundary surface of spheroidal cementite to a position at 20 nm away in the base material were determined, and were referred to as the contents of the boundary Fe, the boundary Si, the boundary Mn, the boundary Cr, the boundary Cu, the boundary Ni, and the boundary Mo, respectively.

Measurement Conditions
Magnification: 500000 times
Measurement step: 2 nm
Analysis length: 100 nm Measurement of Circularity Coefficient of Cementite Each test specimen after the heat treatment was cut at the longitudinal section (cross section in parallel with the rolling direction) so as to allow observation of the position of D (diameter)/4. Thus, the position of D/4 was observed at 2000 times by a scanning electron microscope. The size of one visual field was 2688 μm², and a total of four visual fields (2688 μm²×4=10752 μm²) were observed. Then, using particle analysis software [particle analysis III], for those having a cementite particle size (circle equivalent diameter) of 0.13 μm or more, the circularity coefficient was calculated by the following equation (1).

$$\text{Circularity coefficient} = 4\pi \times \text{area}/(\text{circumference length})^2$$

Evaluation of Cold Workability (Cold Forging Property)

From the axial center part of the steel after the spheroidizing annealing, a test specimen with a diameter of 14 mm, and a length of 21 mm was cut, and was subjected to cold working at a compression ratio (working ratio) of 60% using a press tester. Then, the side surface of the test specimen was observed at 20 times by an optical microscope, thereby to confirm the occurrence or non-occurrence of breakage. Thus, the deformability was evaluated. Further, the deformation resistance during working at a compression ratio of 40% was measured.

Incidentally, the compression ratio is determined from the following equation (2).

$$\text{Compression ratio (\%)} = (1 - L/L0) \times 100 \tag{2}$$

(In the equation (2), L0: test specimen length before working, and L: test specimen length after working)

Then, the specimen which did not undergo breakage after working at a compression ratio of 60%, and whose reduction ratio of the deformation resistance relative to the base steel (conventional steel, No. 1) determined from the following equation (3) was 5% or more was determined as successful (excellent in cold workability).

$$\text{Reduction ratio of deformation resistance (\%)} = 100 \times [\text{deformation resistance of No. 1 (934 MPa)} - \text{deformation resistance of each specimen}]/\text{deformation resistance of No. 1 (934 MPa)} \tag{3}$$

These results are shown in Table 3 and Table 4.

| No. | Steel No. | Boundary Si | Boundary Cr | Boundary Mn | Boundary Fe | Boundary Cu | Boundary Ni | Boundary Mo | Circularity coefficient of cementite |
|---|---|---|---|---|---|---|---|---|---|
| 1 | 1 | 0.46 | 1.34 | 0.26 | 97.89 | 0.02 | 0.02 | 0.01 | 0.86 |
| 2 | 1 | 0.51 | 0.81 | 0.06 | 98.55 | 0.02 | 0.04 | 0.01 | 0.87 |
| 3 | 1 | 0.52 | 0.78 | 0.05 | 98.58 | 0.02 | 0.04 | 0.01 | 0.86 |
| 4 | 1 | 0.53 | 0.76 | 0.05 | 98.59 | 0.02 | 0.04 | 0.01 | 0.85 |
| 5 | 1 | 0.54 | 0.74 | 0.04 | 98.61 | 0.02 | 0.04 | 0.01 | 0.84 |
| 6 | 1 | 0.5 | 0.98 | 0.16 | 98.29 | 0.03 | 0.03 | 0.01 | 0.88 |
| 7 | 1 | 0.48 | 1.02 | 0.19 | 98.35 | 0.02 | 0.03 | 0.01 | 0.86 |
| 8 | 1 | 0.48 | 1.22 | 0.2 | 98.25 | 0.02 | 0.03 | 0.01 | 0.87 |
| 9 | 1 | 0.47 | 1.15 | 0.31 | 98.01 | 0.02 | 0.03 | 0.01 | 0.88 |
| 10 | 1 | 0.54 | 0.85 | 0.08 | 98.48 | 0.02 | 0.02 | 0.01 | 0.74 |
| 11 | 1 | 0.49 | 0.82 | 0.07 | 98.56 | 0.02 | 0.03 | 0.01 | 0.75 |
| 12 | 1 | 0.51 | 0.83 | 0.06 | 98.53 | 0.02 | 0.04 | 0.01 | 0.73 |
| 13 | 1 | 0.52 | 0.87 | 0.06 | 98.48 | 0.02 | 0.04 | 0.01 | 0.76 |
| 14 | 2 | 0.58 | 0.75 | 0.03 | 98.49 | 0.06 | 0.07 | 0.02 | 0.84 |
| 15 | 3 | 0.35 | 0.74 | 0.04 | 98.82 | 0.03 | 0.02 | 0 | 0.86 |
| 16 | 4 | 0.42 | 0.83 | 0.08 | 98.61 | 0.02 | 0.02 | 0.02 | 0.86 |
| 17 | 5 | 0.75 | 0.88 | 0.08 | 98.25 | 0.01 | 0.02 | 0.01 | 0.88 |
| 18 | 6 | 0.33 | 0.82 | 0.14 | 98.6 | 0.03 | 0.06 | 0.02 | 0.87 |
| 19 | 7 | 0.51 | 0.83 | 0.09 | 98.51 | 0.03 | 0.02 | 0.01 | 0.71 |
| 20 | 8 | 0.55 | 0.84 | 0.04 | 98.47 | 0.05 | 0.03 | 0.02 | 0.84 |
| 21 | 9 | 0.51 | 1.04 | 0.09 | 98.28 | 0.05 | 0.01 | 0.02 | 0.82 |
| 22 | 10 | 0.53 | 0.87 | 0.07 | 98.33 | 0.17 | 0.01 | 0.02 | 0.87 |
| 23 | 11 | 0.52 | 0.89 | 0.06 | 98.32 | 0.05 | 0.15 | 0.01 | 0.86 |
| 24 | 12 | 0.51 | 0.88 | 0.05 | 98.5 | 0 | 0.01 | 0.05 | 0.84 |
| 25 | 13 | 0.39 | 0.74 | 0.04 | 98.79 | 0.03 | 0.01 | 0 | 0.86 |
| 26 | 13 | 0.38 | 0.78 | 0.06 | 98.74 | 0.03 | 0.01 | 0 | 0.88 |
| 27 | 13 | 0.4 | 0.72 | 0.03 | 98.81 | 0.03 | 0.01 | 0 | 0.84 |
| 28 | 13 | 0.39 | 0.71 | 0.04 | 98.82 | 0.03 | 0.01 | 0 | 0.82 |
| 29 | 14 | 0.45 | 0.78 | 0.04 | 98.67 | 0.03 | 0.02 | 0.01 | 0.85 |
| 30 | 14 | 0.46 | 0.75 | 0.03 | 98.7 | 0.03 | 0.02 | 0.01 | 0.81 |
| 31 | 14 | 0.44 | 0.83 | 0.04 | 98.63 | 0.03 | 0.02 | 0.01 | 0.87 |
| 32 | 14 | 0.45 | 0.72 | 0.03 | 98.74 | 0.03 | 0.02 | 0.01 | 0.82 |
| 33 | 15 | 0.49 | 0.81 | 0.05 | 98.51 | 0.06 | 0.05 | 0.03 | 0.84 |
| 34 | 16 | 0.52 | 0.83 | 0.06 | 98.43 | 0.08 | 0.07 | 0.01 | 0.89 |
| 35 | 17 | 0.57 | 0.85 | 0.07 | 98.35 | 0.06 | 0.09 | 0.01 | 0.88 |
| 36 | 18 | 0.43 | 0.78 | 0.04 | 98.66 | 0.03 | 0.05 | 0.01 | 0.87 |
| 37 | 18 | 0.42 | 0.75 | 0.03 | 98.72 | 0.03 | 0.04 | 0.01 | 0.84 |
| 38 | 18 | 0.44 | 0.83 | 0.07 | 98.58 | 0.03 | 0.04 | 0.01 | 0.88 |
| 39 | 18 | 0.45 | 0.77 | 0.04 | 98.66 | 0.03 | 0.04 | 0.01 | 0.83 |
| 40 | 18 | 0.42 | 0.95 | 0.11 | 98.43 | 0.04 | 0.04 | 0.01 | 0.89 |
| 41 | 18 | 0.4 | 1.04 | 0.13 | 98.35 | 0.03 | 0.04 | 0.01 | 0.88 |

-continued

| | | Density of each element in boundary region (mass %) | | | | | | | |
|---|---|---|---|---|---|---|---|---|---|
| No. | Steel No. | Boundary Si | Boundary Cr | Boundary Mn | Boundary Fe | Boundary Cu | Boundary Ni | Boundary Mo | Circularity coefficient of cementite |
| 42 | 18 | 0.4 | 1.17 | 0.13 | 98.22 | 0.03 | 0.04 | 0.01 | 0.86 |
| 43 | 18 | 0.4 | 1.11 | 0.21 | 98.2 | 0.03 | 0.04 | 0.01 | 0.89 |
| 44 | 18 | 0.46 | 0.82 | 0.05 | 98.59 | 0.03 | 0.04 | 0.01 | 0.75 |
| 45 | 18 | 0.41 | 0.79 | 0.05 | 98.67 | 0.03 | 0.04 | 0.01 | 0.77 |
| 46 | 18 | 0.43 | 0.8 | 0.04 | 98.65 | 0.03 | 0.04 | 0.01 | 0.74 |
| 47 | 18 | 0.44 | 0.84 | 0.04 | 98.61 | 0.02 | 0.04 | 0.01 | 0.77 |
| 48 | 18 | 0.42 | 0.76 | 0.03 | 98.7 | 0.03 | 0.05 | 0.01 | 0.72 |

TABLE 4

| | | Cold workability (cold forging property) | | |
|---|---|---|---|---|
| No. | Steel No. | Deformation resistance (MPa) | Reduction ratio of deformation resistance (%) | Breakage determination |
| 1 | 1 | 934 | 0 | ○ |
| 2 | 1 | 854 | 8.6 | ○ |
| 3 | 1 | 844 | 9.6 | ○ |
| 4 | 1 | 840 | 10.1 | ○ |
| 5 | 1 | 837 | 10.4 | ○ |
| 6 | 1 | 921 | 1.4 | ○ |
| 7 | 1 | 923 | 1.2 | ○ |
| 8 | 1 | 938 | −0.4 | ○ |
| 9 | 1 | 945 | −1.2 | ○ |
| 10 | 1 | 875 | 6.3 | x |
| 11 | 1 | 874 | 6.4 | x |
| 12 | 1 | 878 | 6 | x |
| 13 | 1 | 887 | 5 | x |
| 14 | 2 | 854 | 8.6 | ○ |
| 15 | 3 | 834 | 10.7 | ○ |
| 16 | 4 | 847 | 9.3 | ○ |
| 17 | 5 | 945 | −1.2 | ○ |
| 18 | 6 | 897 | 4 | ○ |
| 19 | 7 | 881 | 5.7 | x |
| 20 | 8 | 945 | −1.2 | ○ |
| 21 | 9 | 912 | 2.4 | ○ |
| 22 | 10 | 942 | −0.9 | ○ |
| 23 | 11 | 923 | 1.2 | ○ |
| 24 | 12 | 911 | 2.5 | ○ |
| 25 | 13 | 834 | 10.7 | ○ |
| 26 | 13 | 855 | 8.5 | ○ |
| 27 | 13 | 831 | 11 | ○ |
| 28 | 13 | 829 | 11.2 | ○ |
| 29 | 14 | 838 | 10.3 | ○ |
| 30 | 14 | 832 | 10.9 | ○ |
| 31 | 14 | 864 | 7.5 | ○ |
| 32 | 14 | 833 | 10.8 | ○ |
| 33 | 15 | 851 | 8.9 | ○ |
| 34 | 16 | 864 | 7.5 | ○ |
| 35 | 17 | 884 | 5.4 | ○ |
| 36 | 18 | 842 | 9.9 | ○ |
| 37 | 18 | 835 | 10.6 | ○ |
| 38 | 18 | 875 | 6.3 | ○ |
| 39 | 18 | 837 | 10.4 | ○ |
| 40 | 18 | 908 | 2.8 | ○ |
| 41 | 18 | 910 | 2.6 | ○ |
| 42 | 18 | 925 | 1 | ○ |
| 43 | 18 | 932 | 0.2 | ○ |
| 44 | 18 | 863 | 7.6 | x |
| 45 | 18 | 862 | 7.7 | x |
| 46 | 18 | 866 | 7.3 | x |
| 47 | 18 | 875 | 6.3 | x |
| 48 | 18 | 895 | 4.2 | x |

From Tables 1 to 4, it can be considered as follows. Nos. 2 to 5, 14 to 16, and 25 to 39 satisfy the requirements in the present invention, and provide bearing steels exhibiting favorable cold workability. In contrast, examples other than the Nos. do not satisfy all of the requirements specified in the present invention, and hence do not provide excellent cold workability. Particularly, the results are as follows.

Namely, No. 1 is a base steel (conventional steel). The cooling rate after hot rolling was slow (1° C./s), and the average heating rate for spheroidizing annealing was slow (80° C./s). Further, the soaking time was long (6 hr), and further, the cooling rate to 680° C. after soaking was slow (15° C./hr). For these reasons, the boundary Cr and the boundary Mn could not be controlled within respective prescribed ranges, so that the deformation resistance was high (934 MPa).

Incidentally, for No. 1, the cooling rate after hot rolling was slow (1° C./s), but the circularity coefficient of spheroidal cementite was 0.80 or more. The reason for this is that the soaking time is long (6 hr).

For No. 6 and No. 40, the heating time to the soaking temperature was too slow. For this reason, in both cases, the boundary Cr and the boundary Mn could not be controlled within respective prescribed ranges, resulting in an increase in deformation resistance (No. 6: 921 MPa, No. 40: 908 MPa).

For No. 7 and No. 41, the soaking temperature was too high (No. 7: 820° C., No. 41: 830° C.). For this reason, in both cases, the boundary Cr and the boundary Mn could not be controlled within respective prescribed ranges, resulting in an increase in deformation resistance (No. 7: 923 MPa, No. 41: 910 MPa).

For No. 8 and No. 42, the soaking time was too long (No. 8: 5 hr, No. 42: 7 hr). For this reason, in both cases, the boundary Cr and the boundary Mn could not be controlled within respective prescribed ranges, resulting in an increase in deformation resistance (No. 8: 938 MPa, No. 42: 925 MPa).

For No. 9 and No. 43, the cooling rate to 680° C. after soaking was too slow (No. 9: 30° C./hr, No. 43: 30° C./hr). For this reason, in both cases, the boundary Cr and the boundary Mn could not be controlled within respective prescribed ranges, resulting in an increase in deformation resistance (No. 9: 945 MPa, No. 43: 932 MPa).

For No. 10 and No. 44, the cooling rate after hot rolling was too slow (No. 10: 1° C./s, No. 44: 5° C./s). For this reason, the circularity coefficient of cementite was smaller than 0.80. As a result, breakage was caused during cold working.

For No. 11 and No. 45, the average heating rate during spheroidizing annealing was too fast (No. 11: 170° C./hr, No. 45: 180° C./hr). For this reason, pearlite was not divided sufficiently, and the circularity coefficient of cementite was smaller than 0.80. As a result, breakage was caused during cold working.

For No. 12 and No. 46, the soaking time was too short (No. 12: 0.5 hr, No. 46: 0.5 hr). For this reason, division of pearlite was insufficient, and the circularity coefficient of cementite was smaller than 0.80. As a result, breakage was caused during cold working.

For No. 13 and No. 47, the soaking temperature was too low (No. 13: 760° C., No. 47: 760° C.). For this reason, division of pearlite was insufficient, and the circularity coefficient of cementite was smaller than 0.80. As a result, breakage was caused during cold working.

For No. 48, the cooling rate to 680° C. after soaking was too fast (200° C./hr). For this reason, spheroidizing of precipitated cementite was insufficient, and the circularity coefficient of cementite was smaller than 0.80. As a result, breakage was caused during cold working.

For No. 17, the Si content of the steel (steel No. 5) was excessive (0.38 mass %). For this reason, the boundary Si content was outside the prescribed range, resulting in an increase in deformation resistance (945 MPa).

For No. 18, the Mn content of the steel (steel No. 6) was excessive (0.44 mass %). For this reason, the boundary Mn content was outside the prescribed range, resulting in an increase in deformation resistance (897 MPa).

For No. 19, the Cr content of the steel (steel No. 7) was insufficient (0.97 mass %). For this reason, the circularity coefficient of cementite was smaller than 0.80. As a result, breakage was caused during cold working.

For No. 20, the C content of the steel (steel No. 8) was excessive (1.14 mass %). For this reason, the deformation resistance increased (945 MPa). For No. 21, the Cr content of the steel (steel No. 9) was excessive (1.58 mass %). For this reason, the boundary Cr content was outside the prescribed range, resulting in an increase in deformation resistance (912 MPa).

For No. 22, the Cu content of the steel (steel No. 10) was excessive (0.07 mass %). For this reason, the boundary Cu content was outside the prescribed range, resulting in an increase in deformation resistance (942 MPa). Whereas, for No. 23, the Ni content of the steel (steel No. 11) was excessive (0.08 mass %). For this reason, the boundary Ni content was outside the prescribed range, resulting in an increase in deformation resistance (923 MPa).

For No. 24, the Mo content of the steel (steel No. 12) was excessive (0.06 mass %). For this reason, the boundary Mo content was outside the prescribed range, resulting in an increase in deformation resistance (911 MPa).

The invention claimed is:

1. A bearing steel excellent in cold workability, satisfying:
C: 0.95 to 1.10% (in terms of mass %, the same shall apply to the chemical components, hereinafter),
Si: 0.10 to 0.30%,
Mn: 0.1% to 0.40%,
Cr: 1.00 to 1.50%,
Ni: 0.05% or less (excluding 0%),
Cu: 0.05% or less (excluding 0%), and
Mo: 0.03% or less (including 0%),
and the balance consisting of iron and inevitable impurities,
wherein Si (boundary Si), Ni (boundary Ni), Cu (boundary Cu), Mo (boundary Mo), Mn (boundary Mn), and Cr (boundary Cr) included in a region (boundary region) from a boundary surface of spheroidal cementite to a position at 20 nm away in a base material satisfy the following ranges, respectively, and the circularity coefficient of the spheroidal cementite is 0.80 or more:
boundary Si: 0.6% or less (excluding 0%),
boundary Ni: 0.10% or less (excluding 0%),
boundary Cu: 0.10% or less (excluding 0%),
boundary Mo: 0.03% or less (including 0%),
boundary Mn: 0.10% or less (excluding 0%), and
boundary Cr: 0.9% or less (excluding 0%).

2. A method for manufacturing the bearing steel according to claim 1, comprising:
using a steel having the composition described in claim 1,
performing spheroidizing annealing after hot rolling,
setting an average cooling rate for cooling to 740° C. after the hot rolling to 8° C./s or more, and raising temperature at an average heating rate of 100 to 150° C./hr from room temperature to a temperature range of 780 to 800° C. (soaking temperature) in the spheroidizing annealing,
heating at the soaking temperature for 1 to 2 hours, and then,
cooling at an average cooling rate of 50 to 150° C./hr from the soaking temperature to 680° C.

* * * * *